United States Patent [19]
Brown

[11] Patent Number: 5,653,595
[45] Date of Patent: Aug. 5, 1997

[54] INSTRUCTIONAL AID FOR TEACHING TIME TELLING

[76] Inventor: Corine Brown, 1020 Scotland Dr. Apt. 3209, DeSoto, Tex. 75115

[21] Appl. No.: 633,689

[22] Filed: Apr. 19, 1996

[51] Int. Cl.6 .................................................. G09B 19/12
[52] U.S. Cl. .............................. 434/304; 434/174
[58] Field of Search ............................ 434/304, 174, 434/206; 368/77

[56] References Cited

U.S. PATENT DOCUMENTS

| | | | |
|---|---|---|---|
| 624,619 | 5/1899 | Bevington | 434/304 |
| 680,018 | 8/1901 | Brake | 434/304 |
| 1,438,153 | 12/1922 | Whalen | 434/304 |
| 1,759,080 | 5/1930 | Youngblodt | 434/304 |
| 2,039,921 | 5/1936 | Murphy | 434/304 |
| 2,172,450 | 9/1939 | Bitcher | 434/304 |
| 3,131,489 | 5/1964 | Alpert | 35/39 |
| 3,670,428 | 6/1972 | Hall | 434/304 |
| 3,702,507 | 11/1972 | Rumey | 434/304 |
| 3,967,389 | 7/1976 | Brooks | 434/304 |
| 4,124,945 | 11/1978 | Totten | 35/39 |
| 4,313,727 | 2/1982 | Hults | 434/174 |
| 4,368,046 | 1/1983 | Bernick | 434/304 |

Primary Examiner—Paul J. Hirsch
Attorney, Agent, or Firm—Joseph N. Breaux

[57] ABSTRACT

An instructional aid for teaching time telling comprising a disk shaped dial assembly; a first ring shaped minute indicia ring having first indicia sequentially indicating the numerals five through sixty in numerical increments of five spaced about the perimeter thereof; a second ring shaped minute indicia ring having second indicia sequentially indicating the numerals one through sixty spaced about the perimeter thereof; a partial ring, arcuately shaped before-the-hour minute indicia member having third indicia thereon indicating the numerals one through thirty and the numeral sixty thereon; and a before/after indicia ring having fourth indicia thereon indicating a before portion and an after portion. The dial assembly, the first minute indicia ring, the second minute indicia ring, the before-the-hour minute indicia member, and the before/after indicia ring are interconnectable and, preferably, are interconnectable to form a circular disk.

10 Claims, 3 Drawing Sheets

INSTRUCTIONAL AID FOR TEACHING TIME TELLING

TECHNICAL FIELD

The present invention relates to devices used to instruct children how to tell time and more particularly to a multi-part device having various interconnecting portions for teaching a variety of time telling forms.

BACKGROUND ART

It is often difficult to instruct children on the various time telling forms. Although a child may understand if he/she is told that the time is "one-fifteen" he/she may be confused if the time is indicated in a form such as "fifteen after one" or "twenty minutes to two". It would be a benefit, therefore, to have a device that could be used to instruct children in the various time telling forms. It would be a further benefit if the instructional aids for one or more of the time telling aids could be removed so as not to unduly confuse the child when he/she is learning a first form of telling time.

GENERAL SUMMARY DISCUSSION OF INVENTION

It is thus an object of the invention to provide an instructional aid for teaching time telling that can be used to instruct children in the various time telling forms.

It is a further object of the invention to provide an instructional aid for teaching time telling that includes multiple portions that can be removed so as not to unduly confuse the child when he/she is learning a first form of telling time.

Accordingly, an instructional aid for teaching time telling is provided. The instructional aid comprises a disk shaped dial assembly having a circular shaped face portion having dial indicia indicating the numerals one through twelve sequentially spaced about the perimeter thereof and a pointer mechanism including an hour indicating pointer and a minute indicating pointer rotatably connected to a center of the face portion; a first ring shaped minute indicia ring having first indicia sequentially indicating the numerals five through sixty in numerical increments of five spaced about the perimeter thereof, the first minute indicia ring having a first internal diameter defining a substantially cylindrical dial assembly void in a manner such that the dial assembly may be fit and frictionally held within the dial assembly void by contact between the dial assembly and the first minute indicia ring; a second ring shaped minute indicia ring having second indicia sequentially indicating the numerals one through sixty spaced about the perimeter thereof, the second minute indicia ring having a first outer diameter and a second internal diameter defining a substantially cylindrical first ring void in a manner such that the first minute indicia ring may be fit and frictionally held within the first ring void by contact between the first minute indicia ring and the second minute indicia ring; a partial ring, arcuately shaped before-the-hour minute indicia member having an external arc defined by a first radius of a length at least one-half inch greater than one-half the first outer diameter of the second minute indicia ring and an internal arc of a first length greater than one-half the outer circumference of the second minute indicia ring and defined by a radius equal to one-half the first outer diameter of the second minute indicia ring, the before-the-hour minute indicia member having third indicia thereon indicating the numerals one through thirty and the numeral sixty thereon; and a before/after indicia ring having a first internal, arcuate curved portion defined by the first radius and a second internal arcuate curved portion defined by a radius equal to one-half the first outer diameter of the second minute indicia ring, the before/after indicia ring having fourth indicia thereon indicating a before portion and an after portion. The dial assembly, the first minute indicia ring, the second minute indicia ring, the before-the-hour minute indicia member, and the before/after indicia ring are interconnectable and, preferably, are interconnectable to form a circular disk.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
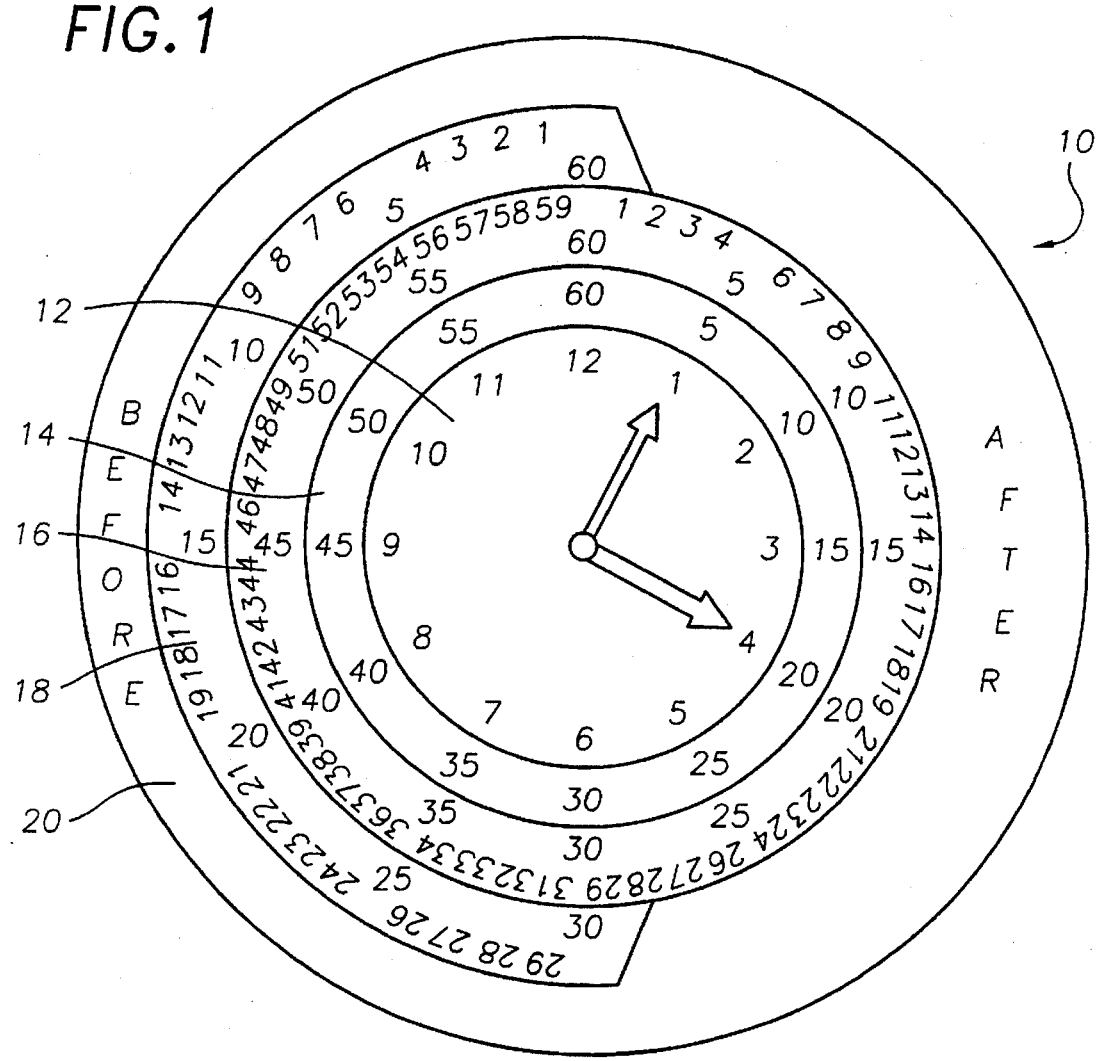
FIG. 1 is a is a plan view of an exemplary embodiment of the instructional aid for teaching time telling of the present invention showing the dial assembly, the first minute indicia ring, the second minute indicia ring, the before-the-hour minute indicia member, and the before/after indicia ring in the fully interconnected configuration.

FIG. 1 shows an exemplary embodiment of the instructional aid for teaching time telling of the invention generally designated by the numeral 10. Instructional aid 10 incudes a dial assembly 12, a first minute indicia ring 14, a second minute indicia ring 16, a before-the-hour minute indicia member 18, and a before/after indicia ring 20. In this embodiment, dial assembly 12, first minute indicia ring 14, second minute indicia ring 16, before-the-hour minute indicia member 18, and before/after indicia ring 20 are interconnectable to form a circular disk.

Figure 2:
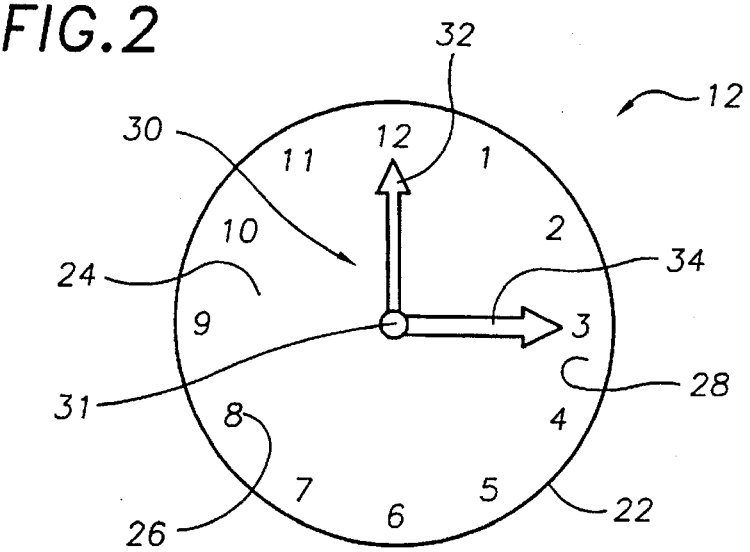
FIG. 2 is a plan view of the dial assembly in isolation.

With reference to FIG. 2, dial assembly 12 is a one inch thick, two and one-quarter inch outer diameter, circular disk shaped plastic member 22 having a circular shaped face portion 24 having integrally formed dial indicia 26 indicating the numerals one through twelve sequentially spaced about the perimeter 28 thereof. A pointer mechanism, generally designated by the numeral 30, is rotatably connected to the center of face portion 24 by a securing pin 31. Pointer mechanism 30 includes an hour indicating pointer 32 and a minute indicating pointer 34. Pointers 32,34 are positionable by a user to point at numeric indicia 26.

Figure 3:
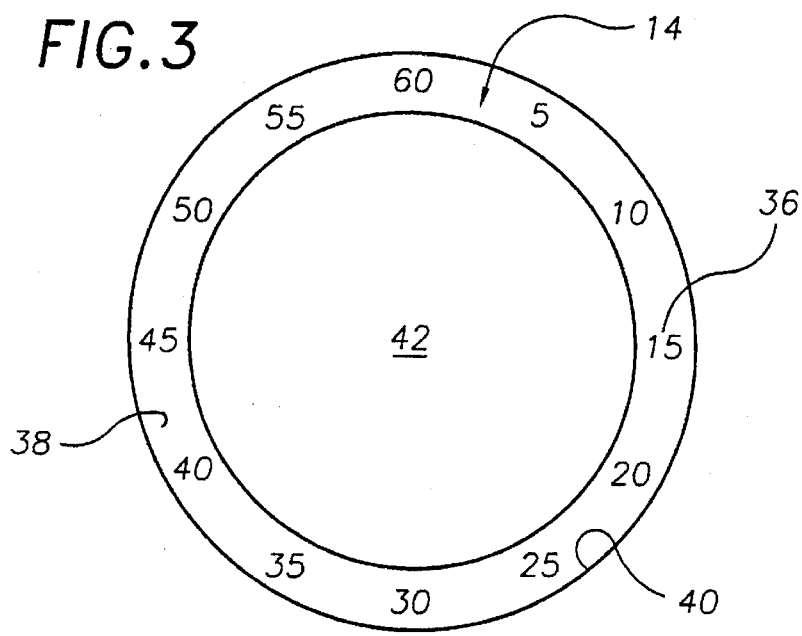
FIG. 3 is a plan view of the first minute indicia ring in isolation.

With reference to FIG. 3, first minute indicia ring 14 is a one inch thick, circular washer shaped plastic member having an internal diameter of two and one-quarter inches and an outer diameter of three and three eighths inches. First indicia 36 that sequentially indicates the numerals five through sixty in numerical increments of five are integrally formed on a first substantially planar surface 38 of first indicia ring 14 and are spaced about the perimeter 40 thereof. First minute indicia ring 14 defines a substantially cylindrical shaped dial assembly void 42. Because the internal diameter of first minute indicia ring 14 and the outer diameter of dial assembly 12 are equal, dial assembly 12 can be positioned and frictionally held within the dial assembly void by contact between dial assembly 12 and first minute indicia ring 14.

Figure 4:
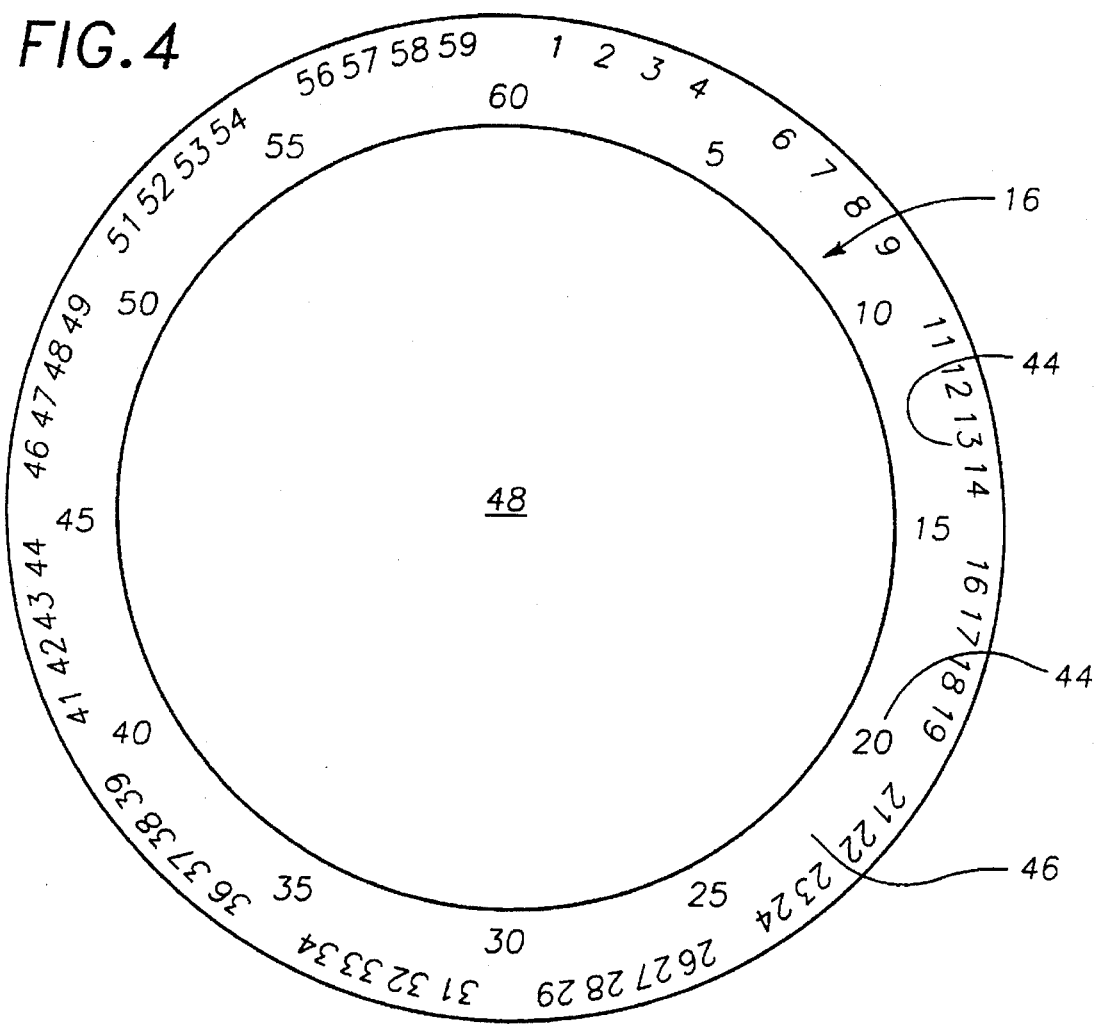
FIG. 4 is a plan view of the second minute indicia ring in isolation.

With reference to FIG. 4, second minute indicia ring 16 is a one inch thick, circular washer shaped plastic member having an internal diameter of three and three-eighths inches and an outer diameter of four and five-eighths inches. Second indicia 44 that sequentially indicates the numerals one through sixty are integrally formed on a second substantially planar surface 46 are spaced thereon. First minute indicia ring 14 can be positioned and frictionally held within a first ring void 48 defined by first minute indicia ring 14 by contact between first minute indicia ring 14 and second minute indicia ring 16.

Figure 5:
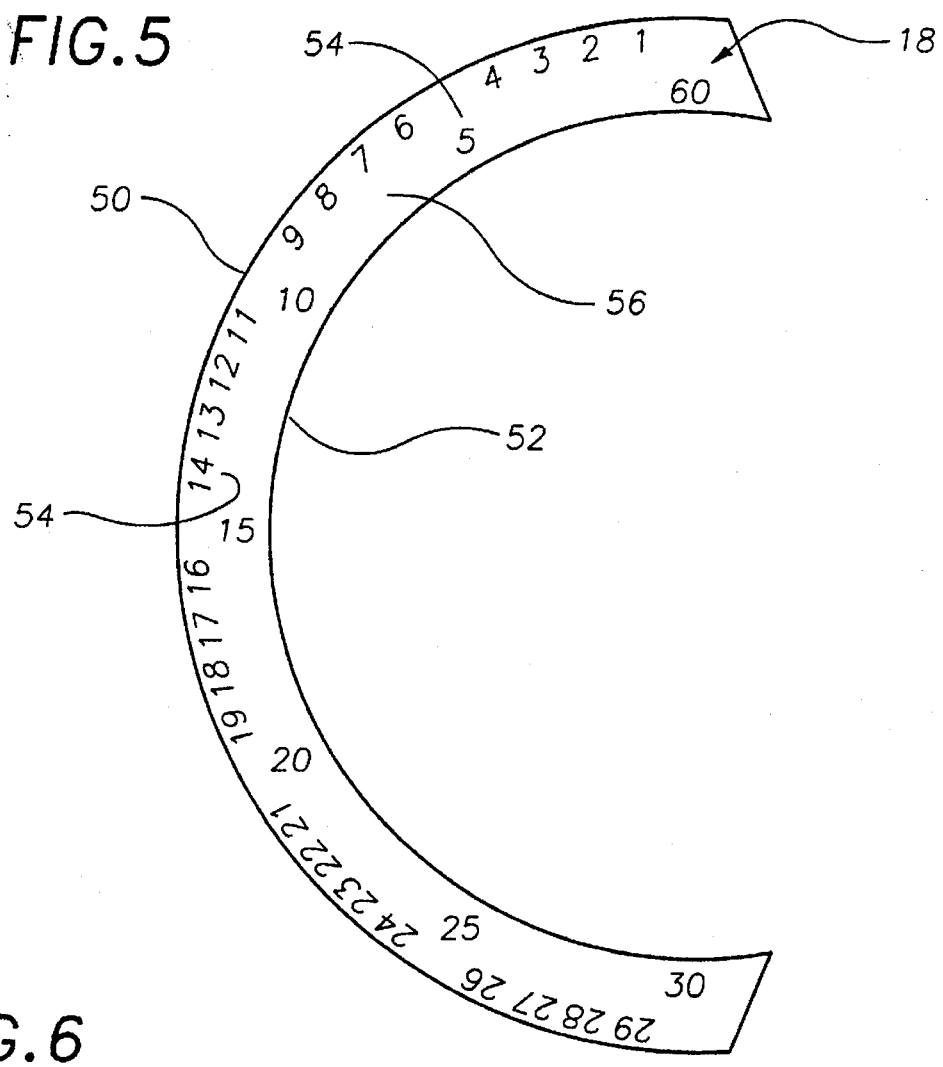
FIG. 5 is a plan view of the before-the-hour minute indicia member in isolation.

With reference to FIG. 5, before-the-hour minute indicia member 18 is a one inch thick, five-eighths inch wide partial ring shaped plastic member having an external arc 50 defined by a first radius of three inches and an internal arc 52 defined by a second radius of two and five-sixteenths inches. Third indicia 54 are provided on a substantially planar surface 56 that indicate the numerals one through thirty and the numeral sixty.

Figure 6:
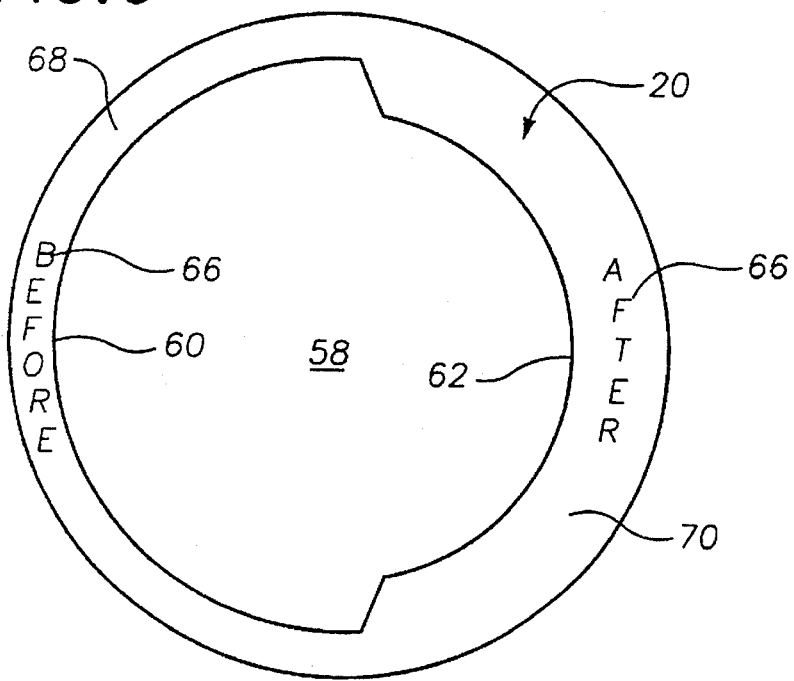
FIG. 6 is a plan view of the before/after indicia ring in isolation.

With reference to FIG. 6, before/after indicia ring 20 is a one inch thick plastic member having a void 58 therein shaped to receive second minute indicia ring 16 and before-the-hour minute indicia member 18 that is defined by a first internal, arcuate curved portion 60 that is defined by a radius of three inches and a second internal arcuate curved portion 62 that is defined by a radius of two and five-sixteenths inches. A substantially planar surface 64 has fourth indicia 66 integrally formed thereon indicating a before portion 68 and an after portion 70.

Use of instructional aid 10 is now described with general reference to FIGS. 1–6. Dial assembly 12 is used in isolation to show the child the hours and operation of the hands of a clock. When the concept of minutes is introduced, dial assembly 12 is inserted into first minute indicia ring 14 and the child introduced to minutes in increments of five minutes. To further reinforce the concept of sixty minutes in an hour, dial assembly 12 and first minute indicia ring 14 are inserted into second minute indicia ring 16. Because second minute indicia ring 16 shows the minutes sequentially from one to sixty, the child can see the incremental size allotted to each minute on the dial of a clock.

Once the child has mastered the concept of hours and minutes and is able to tell time in the form designating the hours and minutes, the child can be introduced into the time telling form "minutes after the hour", such as ten minutes after three, and the form "minutes before the hour", such as ten minutes until three, by inserting before-the-hour minute indicia member 18 into void 58 and external arc 50 against first internal, arcuate curved portion 60, and then inserting second minute indicia ring 16 into void 58 to form a substantially complete circular disk as shown in FIG. 1. The child can then use third indicia 54 to determine the number of minutes before the hour and second indicia 44 to determine the number of minutes after the hour. The fourth indicia 66 are used to indicate to the child whether the word "before" or the word "after" should be used when speaking the time.

It can be seen from the preceding description that an instructional aid for teaching time telling has been provided that can be used to instruct children in the various time telling forms and that includes multiple portions that can be removed so as not to unduly confuse the child when he/she is learning a first form of telling time.

It is noted that the embodiment of the instructional aid for teaching time telling described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An instructional aid for teaching time telling comprising:

a disk shaped dial assembly having a circular shaped face portion having dial indicia indicating the numerals one through twelve sequentially spaced adjacent a dial perimeter thereof and a pointer mechanism including an hour indicating pointer and a minute indicating pointer rotatably connected to a center of said face portion;

a first ring shaped minute indicia ring having first indicia sequentially indicating the numerals five through sixty in numerical increments of five spaced adjacent a first ring perimeter thereof, said first minute indicia ring having a first internal diameter defining a substantially cylindrical dial assembly void in a manner such that said dial assembly is positionable and frictionally held within said dial assembly void by contact between said dial assembly and said first minute indicia ring;

a second ring shaped minute indicia ring having second indicia sequentially indicating the numerals one through sixty spaced about a second ring perimeter thereof, said second minute indicia ring having a first outer diameter and a second internal diameter defining a substantially cylindrical first ring void in a manner such that said first minute indicia ring is positionable and frictionally held within said first ring void by contact between said first minute indicia ring and said second minute indicia ring;

a partial ring shaped, arcuate before-the-hour minute indicia member having an external arc defined by a first radius of a length at least one-half inch greater than one-half said first outer diameter of said second minute indicia ring and an internal arc of a first length greater than one-half an outer circumference of said second minute indicia ring and defined by a radius equal to one-half said first outer diameter of said second minute indicia ring, said before-the-hour minute indicia member having third indicia thereon indicating the numerals one through thirty and the numeral sixty thereon; and a before/after indicia ring having a first internal, arcuate curved portion defined by a first radius and a second internal arcuate curved portion defined by a radius equal to one-half said first outer diameter of said second minute indicia ring, said before/after indicia ring having fourth indicia thereon indicating a before portion and an after portion;

said dial assembly, said first minute indicia ring, said second minute indicia ring, said before-the-hour minute indicia member, and said before/after indicia ring being interconnectable to form a single unit.

2. The instructional aid for teaching time telling of claim 1, wherein:

said single unit is circular disk shaped.

3. The instructional aid for teaching time telling of claim 1, wherein:

said first indicia are integrally formed with said first minute indicia ring.

4. The instructional aid for teaching time telling of claim 3 wherein:

said second indicia are integrally formed with said second minute indicia ring.

5. The instructional aid for teaching time telling of claim 3 wherein:

said third indicia are integrally formed with said before-the-hour minute indicia member.

6. The instructional aid for teaching time telling of claim 3 wherein:

said fourth indicia are integrally formed with said before/after indicia ring.

7. The instructional aid for teaching time telling of claim 4 wherein:

said third indicia are integrally formed with said before-the-hour minute indicia member.

8. The instructional aid for teaching time telling of claim 4 wherein:

said fourth indicia are integrally formed with said before/after indicia ring.

9. The instructional aid for teaching time telling of claim 8 wherein:

said fourth indicia are integrally formed with said before/after indicia ring.

10. The instructional aid for teaching time telling of claim 1, wherein:

said single unit is circular disk shaped;

said first indicia are integrally formed with said first minute indicia ring;

said second indicia are integrally formed with said second minute indicia ring;

said third indicia are integrally formed with said before-the-hour minute indicia member; and said fourth indicia are integrally formed with said before/after indicia ring.

* * * * *